(12) United States Patent
Dunne et al.

(10) Patent No.: US 11,611,606 B1
(45) Date of Patent: Mar. 21, 2023

(54) SELECTING HOSTING SERVERS FOR INTERACTIVE ELECTRONIC ACTIVITIES

(71) Applicant: Amazon Technologies, Inc., Seattle, WA (US)

(72) Inventors: John Joseph Dunne, Bremerton, WA (US); Siddhartha Shankara Rao, Seattle, WA (US); Tobias DiPasquale, King of Prussia, PA (US); Michael Klingbeil, Hamden, CT (US); Justin Rowe, Burlingame, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/586,700

(22) Filed: Sep. 27, 2019

(51) Int. Cl.
*H04L 65/80* (2022.01)
*H04L 65/403* (2022.01)
*H04L 67/52* (2022.01)

(52) U.S. Cl.
CPC ............ *H04L 65/80* (2013.01); *H04L 65/403* (2013.01); *H04L 67/52* (2022.05)

(58) Field of Classification Search
None
See application file for complete search history.

(56) References Cited

U.S. PATENT DOCUMENTS

| | | | |
|---|---|---|---|
| 6,795,858 B1 * | 9/2004 | Jain | H04L 67/1008 709/226 |
| 6,898,633 B1 * | 5/2005 | Lyndersay | H04L 67/1014 709/217 |
| 7,039,709 B1 * | 5/2006 | Beadle | H04L 45/12 709/203 |
| 10,091,281 B1 * | 10/2018 | Lockhart | H04L 67/1023 |
| 2004/0039820 A1 * | 2/2004 | Colby | H04L 29/06 709/226 |
| 2005/0108328 A1 * | 5/2005 | Berkeland | H04L 65/4046 709/204 |
| 2008/0062997 A1 * | 3/2008 | Nix | H04L 61/1511 370/395.2 |
| 2012/0066302 A1 * | 3/2012 | Petersen | H04L 67/22 709/204 |
| 2012/0106333 A1 * | 5/2012 | Lee | H04L 47/125 370/230 |
| 2017/0264449 A1 * | 9/2017 | Seetharaman | H04L 47/801 |
| 2019/0158546 A1 * | 5/2019 | Page | H04L 65/1006 |

* cited by examiner

*Primary Examiner* — Lance Leonard Barry
*Assistant Examiner* — Mohammad Yousuf A. Mian
(74) *Attorney, Agent, or Firm* — Lee & Hayes, P.C.

(57) ABSTRACT

This disclosure describes selecting the best hosting server(s) in a particular geographical location for the majority of participants in an interactive electronic activity. A request for an electronic interactive activity involving a plurality of nodes is received. At least one factor related to a plurality of potential servers is evaluated with respect to the plurality of nodes, where at least two of the plurality of potential servers are located in different geographical locations. Based at least in part on evaluating the factors, one or more of the potential servers is selected to host the electronic interactive activity, where the one or more of the potential servers selected are located in the same geographical location.

20 Claims, 9 Drawing Sheets

SELECTING HOSTING SERVERS FOR INTERACTIVE ELECTRONIC ACTIVITIES

BACKGROUND

Service providers offer cloud-based services via service provider networks to fulfill user's computing-service needs without the users having to invest in and maintain computing infrastructure required to implement the services. These service providers may provide network-based computing resources and functionality to implement various types of cloud-based services, such as, for example, scalable-storage services, computer-processing services, and so forth. In some examples, developers may utilize services offered by the service provider to run the applications using virtual services (or "instances") provisioned on various configurations of hardware-based resources of a cloud-based service.

In today's world, many meetings are held that involve multiple parties at multiple locations. Thus, such meetings are often handled electronically and may involve audio and/or video in the form of media conferencing among participants. The electronic meetings are generally hosted by one or more hosting servers with which the various parties communicate over a network, such as, for example, the Internet. The hosting servers may be part of a service provider network that may offer a media conferencing service. The participants generally communicate with the hosting servers using electronic devices such as, for example, smart phones, tablets, computers, etc.

User experience with such media conferencing can vary for the various participants based upon the location of the participants. Often, the user experience can vary based upon proximity of participants to the hosting servers. For example, the farther away a participant is from the hosting servers, the worse the user experience may be. Often, this is due to latency issues with regard to audio and video data received and transmitted between the participants via the hosting servers. For example, if a participant is located on the West Coast of the United States and another participant is located in Europe, if the hosting servers are located on the West Coast of the United States, then latency issues for the meeting participant in Europe may be great while latency issues for the participant on the West Coast may be minimal or even non-existent. Thus, due to the increased latency for the participant in Europe, the two participants may notice a lag in communication by the participant in Europe. Accordingly, the two participants may begin to "talk over" each other. Generally, the location of the media conference organizer generally determines the location of the hosting servers. Thus, in this example, since the hosting servers are located on the West Coast, the meeting was likely organized by the meeting participant on the West Coast.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DETAILED DESCRIPTION

Figure 1:
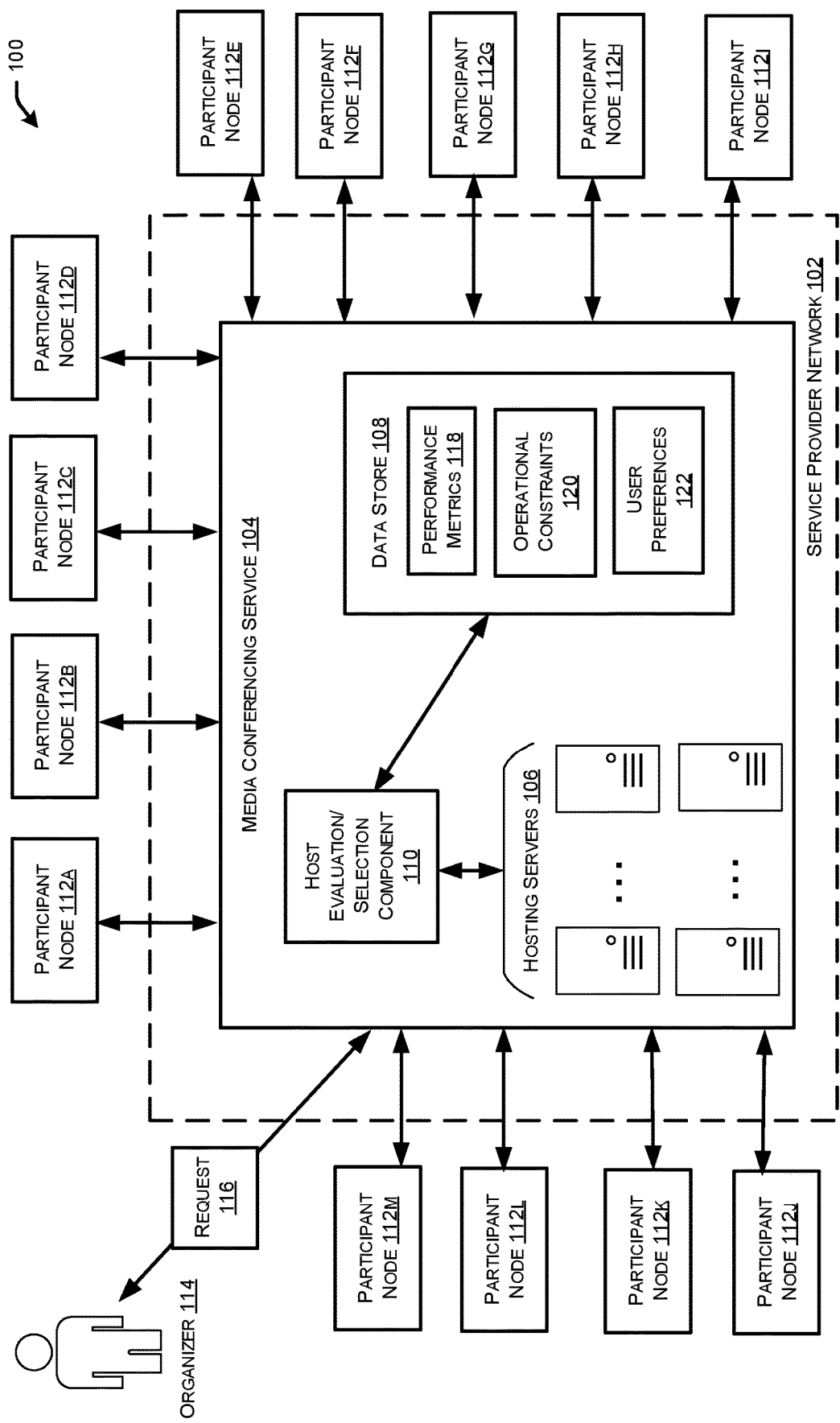
FIG. 1 schematically illustrates a system-architecture diagram of an example environment that includes an example service provider network that provides a media conferencing service.

This disclosure describes, at least in part, techniques and architectures for determining a location for hosting an interactive electronic event, e.g., media conferencing, interactive electronic games, etc., where participants for the interactive electronic event are located in multiple geographic locations. For example, media conferencing including participants located in various regions may be hosted by one or more servers at a geographic location that provides good to optimum user experiences for all participants.

For example, a plurality of hosting servers may be located in various geographical locations. In configurations, the hosting servers are part of a service provider network that provides a media conferencing service. When a media conference is organized for a plurality of participants, the media conferencing service may evaluate factors related to locations of the participants. For example, if there are only two participants, then the media conferencing service may select one or more hosting servers at a location that is approximately half-way between the two participants. This may allow for the latency with respect to audio quality and video quality to be about the same for the two meeting participants. Thus, the two participants may have a good to optimum user experience and may avoid "talking over one another." For example, a first participant may make a first comment and because the time it takes for the second participant to hear the first comment, the first participant makes a second comment before, or at about the same time as, the second participant replies to the first comment.

In particular, for each media conference the regions with attendees, e.g., attendee regions, may be determined. For each region capable of hosting the media conference, e.g., each host region having one or more hosting servers, a "score" may be determined for that host region. In configurations, the scores for the host regions may be based on Round-trip Time (RTT) Tier of Service, latency between participants, or a combination of both, between each attendee region and each potential host region. The host region having the best (or highest) score may be selected to host the media conference. In configurations, if no attendees are located in the selected host region, e.g., the attendee regions are on different continents with respect to the selected host region, and the selected host region is not an intercontinental hub, the next potential host region is selected that has the next best/highest score that is also an intercontinental hub.

In configurations, other factors may also be evaluated in order to select a geographic location for the hosting server(s). For example, if the optimum hosting server(s) geographic location based upon RTT and/or latency is located in a region through which the participants do not wish to have the meeting routed, then a different geographic location may be selected that is acceptable to the participants and that also provides an acceptable user experience for the participants. Thus, other considerations may include company policies, laws, regulations, etc., that may affect where hosting servers may be geographically located. Additionally, operational constraints such as traffic on networks, available capacity of the hosting servers, communication pipeline availability, functionality, etc., may also affect where hosting servers may be geographically located. Thus, in configurations, such additional factors may also affect the geographic location of the hosting servers to be used for a media conference.

Often, media conferencing involves a large number of participants. The number of participants may be scattered in various regions, thereby making it difficult to select a geographic location for the hosting servers that provides an acceptable user experience for all participants. Thus, in configurations, one or more participants that are "outliers" with respect to determining an acceptable location for the hosting servers may be eliminated from consideration. For example, multiple participants may be located in Europe and multiple participants may be located in North America. However, one or more participants may be located in South America. If it is not possible to select a location for the hosting servers that provides an acceptable to near optimum experience for all participants, then, for example, the one or more participants in South America may be eliminated from consideration, e.g., disregarded in evaluating and selecting hosting servers. Accordingly, if eliminating the participants in South America, results in the selection of a location for the hosting servers on, for example, the East Coast of North America, that provides an acceptable to near optimum experience for the participants in North America and Europe, then the hosting servers on the East Coast may be selected for hosting the media conferencing. Unfortunately, the one or more participants in South America may not have a very good user experience during the media conferencing, but the majority of the participants in North America and Europe will have a good to near optimum user experience.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 schematically illustrates an example environment 100 that includes a service provider network 102. The server provider network 102 provides various services to users. For example, the service provider network 102 can provide computing resources, like Virtual Machine (VM) instances and storage, on a permanent or an as-needed basis. In particular, the computing resources provided by the service provider network 102 can include various types of computing resources, such as data processing resources like VM instances, data storage resources, networking resources, data communication resources, network services, and the like. As known, the service provider network 102 may comprise servers that do not require end-user knowledge of the physical location and configuration of the system that delivers the services. Common expressions associated with the service provider network may include, for example, "on-demand computing," "software as a service (SaaS)," "cloud services," "data centers," and so forth. Services provided by the service provider network may be distributed across one or more physical or virtual devices.

In the example environment 100, the service provider network includes a media conferencing service 104. The media conferencing service 104 may include multiple hosting servers 106. In configurations, the multiple hosting servers 106 may be located in multiple geographical locations. In configurations, the media conferencing service 104 also includes a data store 108 and a host evaluation/selection component 110.

Multiple participant nodes 112 are illustrated in the example environment 100 of FIG. 1. The participant nodes 112 represent participants for media conferences provided by the media conferencing service 104. The participant nodes 112 interact with the media conferencing service 104 and the hosting servers 106 via electronic devices such as, for example, smart phones, tablets, laptop computers, desktop computers, telephones, etc. In configurations, the media conferences may comprise just audio or may also include video, e.g., one or more of the participant nodes 112 may participate in a media conference that includes both audio and video (e.g., a video teleconference (VTC)).

When one or more of the participant nodes 112 wish to participate in a media conference, an organizer 114 of the media conference may send a request 116 for the media conference to the media conferencing service 104. The organizer 114 may also be a participant in the media conference. The request 116 may include a date, time, and/or duration for the media conference, as well as a list of participants, e.g., participant nodes 112. The request 116 may also include an anticipated location for each participant node 112.

Based at least in part on geographic locations of the participant nodes 112 that intend to participate in the media conference, the media conferencing service 104 may evaluate performance metrics 118 related to potential hosting servers 106 in various geographical locations with respect to the participant nodes 112 that intend to participate in the media conference. For example, the performance metrics 118 may include latency with regard to transmission of audio data packets and video packets, e.g., audio quality and video quality, between participant nodes 112. In configurations, the latency may be with respect to round-trip time (RTT) between the participant nodes 112 and potential hosting servers 106. Based on International Telecommunication Union (ITU) standards, tiers of service may be based on RTT and its impact on quality: Tier-1 0 to 150 milliseconds (ms)—no perceivable impact; Tier-2 150 to 200 ms— some perceivable impact; Tier-3 200 to 300 ms—acceptable impact; Tier-4 300 to 400 ms—significant impact; and Tier-5 above 400 ms—severe impact. In configurations, the media conferencing service Tier-4 and Tier-5 are combined into a single tier (e.g., Tier-4) as having an unacceptable impact on quality. In configurations, no participant node 112 should have a Tier-3 service, unless the participant node 112 is an outlier, as will be described further herein, and no participant node 112, including outliers, should have a Tier-4 service. Additional performance metrics 118 may include Quality of Service (QoS), the proximity of the participant nodes 112 to the various potential hosting servers 106, performance of potential hosting servers 106, e.g., capacity of the potential hosting servers 106, etc.

The host evaluation/selection component 110 may gather and evaluate the performance metrics 118 from the potential hosting servers 106 with respect to the participant nodes 112. In configurations, the performance metrics are gathered in real-time just prior to the start of the media conference. The performance metrics 118 may be gathered based on an anticipated location of the participant nodes 112, e.g., where participants are expected to be located when the participants join the media conference, and are generally readily available as the service provider network 102 regularly monitors itself with respect to performance for health reasons, e.g., the performance and health of the service provider network 102. Based at least in part on the evaluation of the performance metrics 118, the host evaluation/selection component 110 may generate scores with respect to each hosting server 106 with respect to participant nodes. Based on the scores, the host evaluation/selection component 110 may generate a list of possible hosting servers 106 for the media conference, where the list may include hosting servers 106 ranked based on the scores. In configurations, the list may be a weighted list, where the weights may be based on determined tiers of service for each possible hosting server 106 and/or a calculated score based on performance metrics 118 for each possible hosting server 106. Thus, the list of ranked hosting servers 106 may rank the hosting servers 106 based on the weighted scores.

In configurations, the performance metrics 118 may be stored in the data store 108. In configurations, the performance metrics 118 may not be stored or may be stored elsewhere in the service provider network 102. The host evaluation/selection component 110 may select, from the list of ranked hosting servers 106, a hosting server 106 (or hosting servers 106) at a first geographic location for hosting the media conference based on the ranking of the hosting servers 106. The selected hosting server 106 may comprise a single hosting server 106 at the first geographic location or may comprise multiple hosting servers 106 at the first geographic location.

In configurations, the host evaluation/selection component 110 may consider various operational constraints 120 with respect to the selected hosting server 106. The operational constraints 120 may be stored in the data store 108 or elsewhere in the network service provider network 102. For example, the host evaluation/selection component 110 may consider if the selected hosting server 106 is "down," or inaccessible to one or more participant nodes 112. The evaluation/selection component 110 may also consider capacity issues of hosting servers 106, current testing of hosting servers 106, connection issues (e.g., communication pipelines) between hosting servers 106 and participant nodes 112, regulatory concerns, legal concerns, a time of day, functionality (e.g. software versions), etc., with respect to the selected hosting server 106. For example, the host evaluation/selection component 110 may determine that the selected hosting server 110 is inaccessible to one or more participant nodes 112. Additionally, the host evaluation/selection component 110 may determine that regulations and/or laws within the region of the selected hosting server 106 will not allow for the media conference to be hosted by the selected hosting server 106. Thus, based on the operational constraints 120, the host evaluation/selection component 110 may select another one or more hosting servers 106 from the list, based on the ranking, to host the media conference that still provides a good user experience for the participant nodes 112, but also satisfies any operational constraints 120.

In configurations, the host evaluation/selection component 110 may also consider user preferences 122. The user preferences 122 may be stored in the data store 108 or elsewhere in the network service provider network 102. For example, the organizer 114 may be part of an organization that is organizing the media conference through the media conferencing service 104. If the user preferences 122 for the organization have certain requirements, then the host evaluation/selection component 110 may select one or more hosting servers 106 based on the performance metrics 118, the operational constraints 120, and the user preferences 122. For example, the user preferences 122 may stipulate that hosting servers 106 located in a particular region or geographic location may not be used to host media conferences. Additional examples of user preferences include corporate policies, legal issues, sovereign issues, regulations, potential price differences with respect to different routings between hosting servers 106 and participant nodes 112, etc.

Once a suitable hosting server (or servers) 106 has been selected to host the media conference, then the media conferencing service 104 may facilitate initiation of the media conference or may otherwise allow the media conference to take place. In configurations, the performance metrics 118 are gathered and evaluated in real time just prior to the start of the media conference. The performance metrics 118 may also be based upon historical performance metrics (that may be stored in data store 108) in addition to or instead of real time performance metrics. The historical performance metrics may include, for example, RTT, QoS, performance of potential hosting servers 106, e.g., capacity of the potential hosting servers 106, etc. For example, if historical RTT between participant node 112a and a first hosting server 106 typically provides Tier 1 service, and if historical RTT between participant node 112b and the first hosting server 106 typically provides Tier 1 service, then if participant nodes 112a and 112b want to have a media conference, then the first hosting server 106 may be selected, at least initially, to host the media conference. However, if real time RTT data indicates less than Tier 1 service, or if operational constraints indicate that the first hosting server 106 is unavailable for some reason, then a different hosting server 106 may be selected.

In configurations, during a media conference, the host evaluation/selection component 110 may continually monitor the performance metrics 118. For example, if additional participant nodes 112 join the media conference or if participation nodes 112 leave the media conference before it is completed, then the host evaluation/selection component 110 may determine that the media conference should be moved to different one or more hosting servers 106 at a different location. For example, during a media conference involving participant node 112a, located in New York, and participant node 112b, located in Denver, the hosting server 106 may be located in Chicago, e.g., approximately halfway between New York and Denver. If another participant node 112c located in Miami joins the media conference, the host evaluation/selection component 110 may move the media conference to a hosting server 106 located in Dallas (e.g., a location approximately equidistant from all three participant nodes 112a, 112b, and 112c) so that based on the RTT for each participant node 112, all three participant nodes 112 have a Tier 1 service. The media conferencing service 104 may thus switch the hosting servers 106 hosting the current media conference. The dynamic evaluation of ongoing media conferences may also take into account the operational constraints 120 and/or the user preferences 122 with respect to network performance while dynamically evaluating the media conference.

Figure 2:
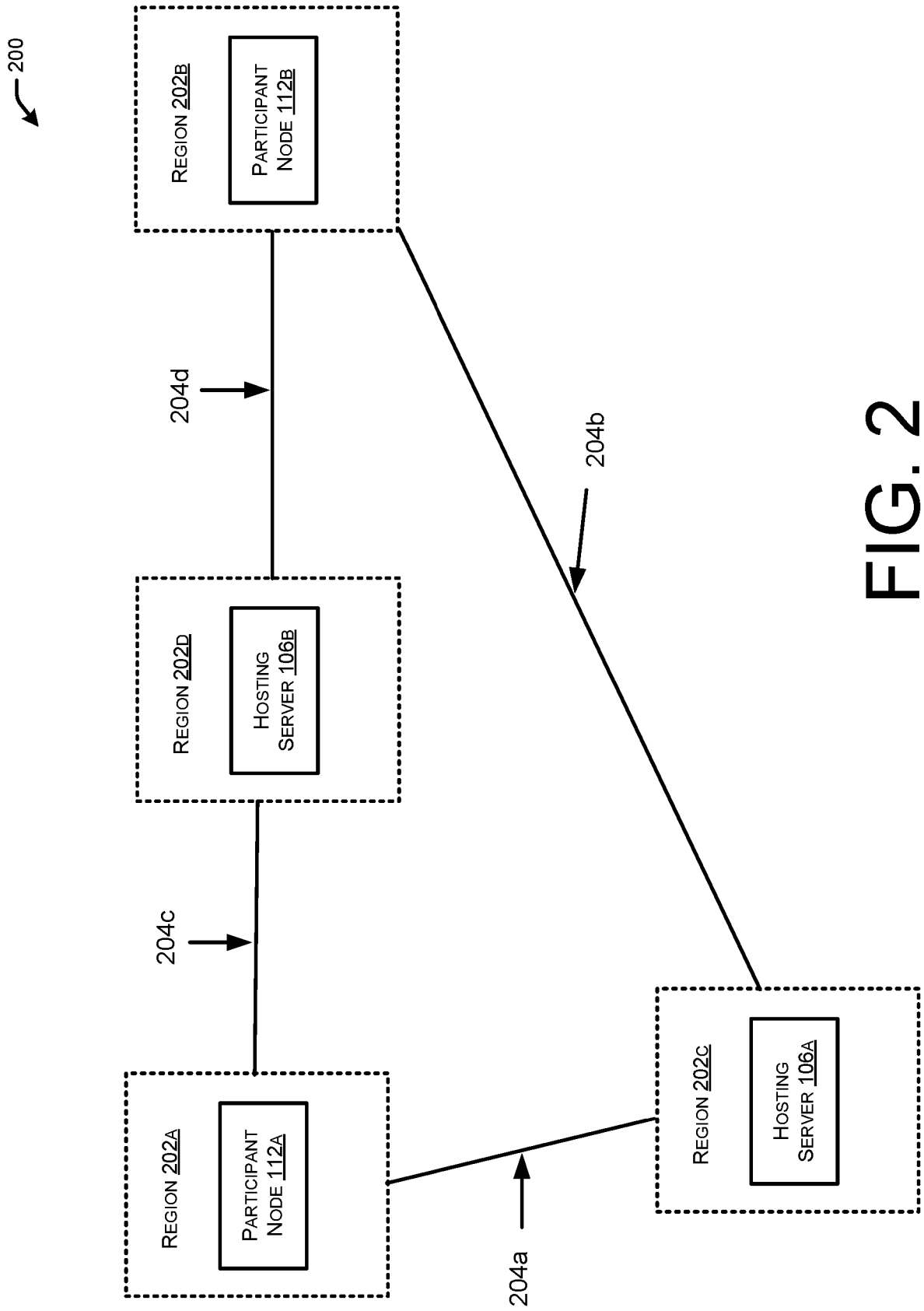
FIG. 2 schematically illustrates another example arrangement of participant nodes and hosting servers of FIG. 1 in different geographical regions.
Figure 3:
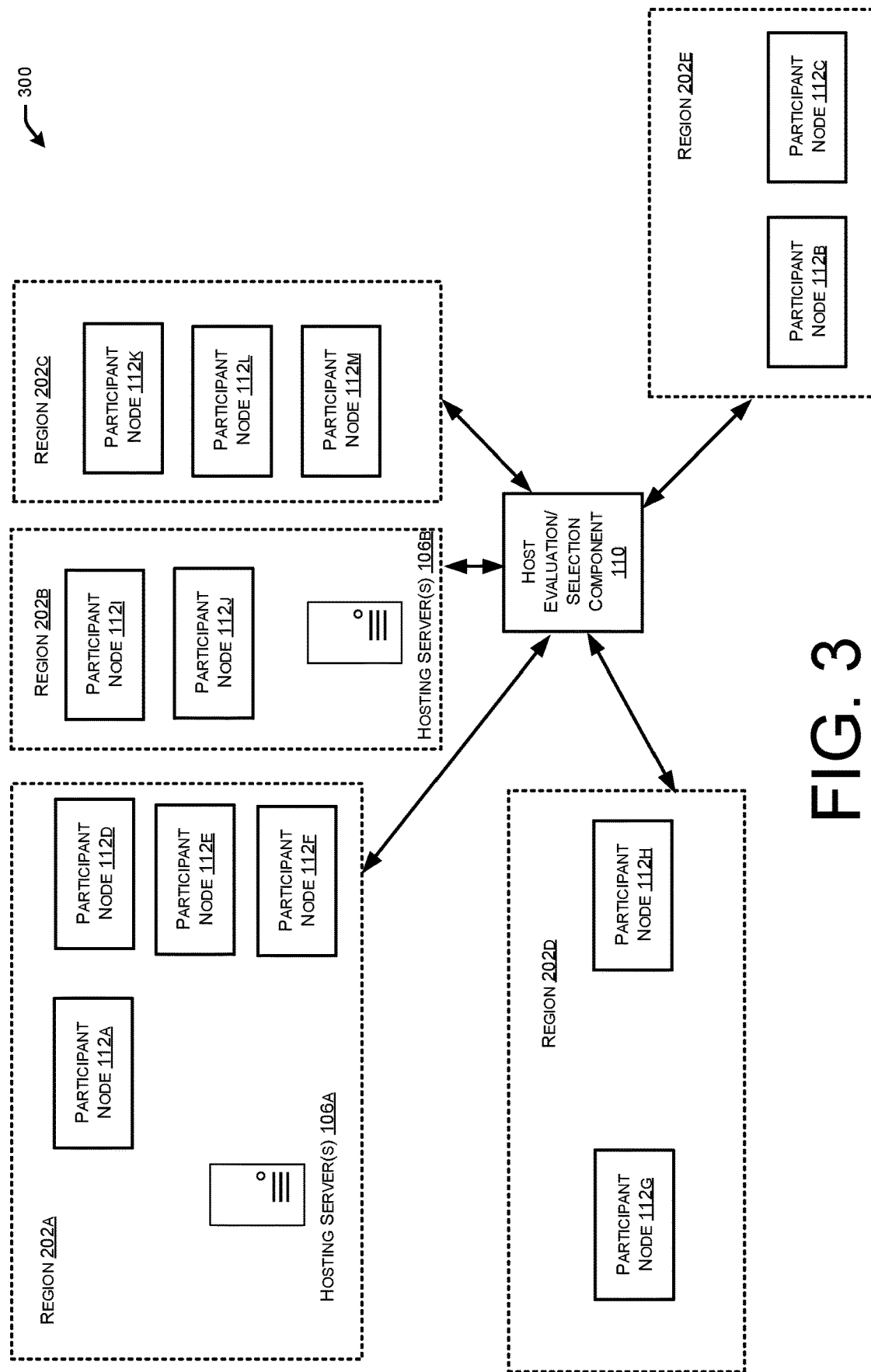
FIG. 3 schematically illustrates another example arrangement of participant nodes and hosting servers of FIG. 1 in different geographical regions.
Figure 4:
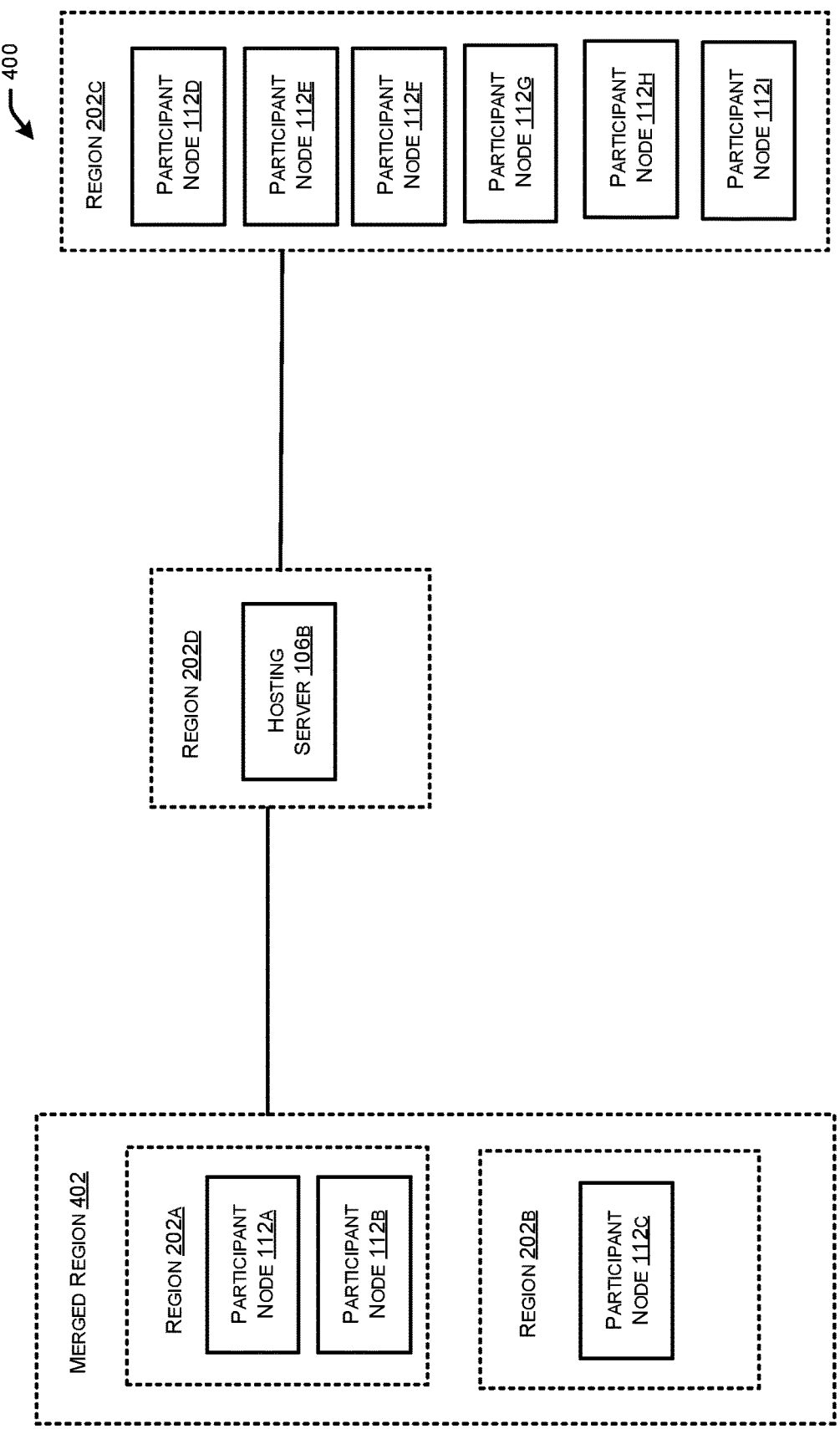
FIG. 4 schematically illustrates another example arrangement of participant nodes and hosting servers of FIG. 1 in different geographical regions.

FIGS. 2-4 provide examples of selecting host regions based on performance metrics, e.g., RTT, latency, etc. In configurations, for each media conference, the geographical regions 202 with participant nodes 112, e.g., attendee regions, may be determined. For each geographical region 202 capable of hosting the media conference, e.g., each host region having one or more hosting servers 106, a "score" may be determined by host evaluation/selection component 110 for that host region. In configurations, the scores for the host regions may be based on RTT Tier of Service, latency between regions, or a combination of both, between each attendee region 202 including participant nodes 112 as attendees and each potential region 202 including one or more hosting servers 106. The region 202 having the best or highest score may be selected by the host evaluation/selection component 110 to host the media conference. In configurations, if no participant nodes 112 are located in the selected region 202 for hosting, e.g., the regions 202 with participant nodes 112 are on different continents with respect to the selected region 202 for hosting, and the selected region for hosting is not an intercontinental hosting hub, e.g., the one or more hosting servers 106 in the selected region are not configured or authorized to host intercontinental media conferences, the next potential region 202 is selected that has the next best/highest score and that is an intercontinental hosting hub.

FIG. 2 schematically illustrates an example arrangement 200 of participant nodes 112a and 112b located in regions 202a and 202b, respectively. Two hosting servers 106a and 106b are located in regions 202c and 202d, respectively. As can be seen, and provided that a length of the lines between regions is representative of respective distances between the regions (e.g., longer lines representing a longer distance and shorter lines representing a shorter distance), participant node 112a is located close (along line 204a) to region 202c but participant node 112b is located a greater distance (along line 204b) from region 202c. Thus, the RTT for participant node 112a with respect to hosting server 106a (e.g., a shorter distance between regions) is smaller than the RTT for participant node 112b with respect to hosting server 106a (e.g., a longer distance between regions). For example, the latency along line 204a may be 10 milliseconds (ms) and the latency along line 204b may be 90 ms, while the latency along lines 204c and 204d may be 50 ms each. Thus, for example, participant node 112a may have a Tier-1 service with respect to hosting server 106a but participant node 112b may have a Tier-3 service with respect to hosting server 106a. However, hosting server 106b located in region 202d is approximately equidistant from participant node 112a (along line 204c) and participant node 112b (along line 204d). Thus, both participant nodes 112a and 112b may have Tier-1 service or Tier-2 service with respect to hosting server 106b, e.g., an equally good experience for both participant nodes 112a and 112b. The score calculated by host evaluation/selection component 110 for region 202c may be determined, if based on RTT and/or latency, as being better/higher than the score for region 202d. Accordingly, region 202c that includes hosting server 106a may be selected by the host evaluation/selection component 110 of FIG. 1 for hosting a media conference between participant nodes 112a and 112b. In configurations, the host evaluation/selection node 110 will also consider operational constraints 120 and/or user preferences 122 as previously described.

FIG. 3 schematically illustrates an example arrangement 300 of participant nodes 112a-112m and hosting servers 106a and 106b. The hosting servers 106a and 106b may comprise one or more servers and are located in different geographical regions 202a and 202b, respectively. The participant nodes 112a-112m are located in one of regions 202a-202e.

When a first participant node 112a (or the organizer 114 of FIG. 1) wishes to organize a media conference involving the other participant nodes 112, the host evaluation/selection component 110 evaluates and selects one or more hosting servers 106 within a particular geographical region 202, as previously described with respect to FIG. 1.

As can be seen in FIG. 3, participant nodes 112b and 112c are the furthest participant nodes 112 in geographic proximity from the hosting servers 106, e.g., outliers. Thus, as the host evaluation/selection component 110 evaluates, e.g., determines scores for regions including hosting servers 106, and attempts to select one or more hosting servers 106, the host evaluation/selection component 110 may have trouble selecting between hosting servers 106a or 106b because the overall quality, e.g., user experience, for all participant nodes 112 may not be as good as desired, e.g., the scores for potential regions having hosting servers 106 may not be good. However, in configurations, the host evaluation/selection component 110 may disregard or eliminate participant nodes 112b and 112c from consideration in evaluating potential hosting servers 106. For example, if regions 202a-202d are in North America but region 202e is in South Africa, there may be no regions 202 that include hosting servers 106, e.g., regions 202b and 202c, that will allow for all participant nodes 112a-112m to achieve Tier-1 or Tier-2 service during a media conference based on RTT and thus, the scores for each region 202 that includes one or more hosting servers 106 determined by the host evaluation/selection component 110 may not meet a predetermined threshold. By eliminating participant nodes 112b and 112c, scores for regions 202a and 202b may reach a desired level such that participant nodes 112a and 112d-112m may now achieve a desired level of quality, e.g., audio quality and/or video quality that is good to near optimum for these participant nodes, e.g., Tier-1 or Tier-2 service based on RTT. For example, after eliminating participant nodes 112b and 112c, the host evaluation/selection component 110 may, based on determined scores, may select region 202b and hosting server 106b for hosting the media conference. Thus, a quorum of the participant nodes 112 is able to achieve a desired quality level by dropping participant nodes 112b and 112c from consideration in determining one or more hosting servers 106. The participant nodes 112a and 112d-112m may have at least close to an equally good experience during the media conference based on, for example, RTT and/or latency as described with respect to FIG. 2, while participant nodes 112b and 112c may only have acceptable experiences during the media conference that is less than the experience of participant nodes 112a and 112d-112m.

FIG. 4 schematically illustrates an example arrangement 400. In configurations, when evaluating potential hosting servers 106, participant nodes 112 may be within different regions 202, e.g., different countries but on the same continent, with respect to each other but may be grouped together as being in the same region 202. For example, participant nodes 112a and 112b are located in region 202a, while participant node 112c is located in region 202b, and participating nodes 112d-112i are located in region 202c. In configurations, regions 202a and 202b may be "merged" into a merged region 402, e.g., considered to be within the same region, 202 for purposes of evaluating potential hosting servers 106 based on RTT. To merge the regions 202a and 202b, in configurations a quorum may be calculated. The quorum may be calculated in order to attempt to achieve an even distribution of participant nodes 112 within regions. The quorum may be determined by the region 202 having the lowest number of participant nodes 112 multiplied by half (50% of participant nodes 112 to provide even distribution between regions 202). In configurations, if the quorum is less than 2, then the quorum may be set at 2 since the quorum cannot be less than 2. Regions 202 having a number of participation nodes 112 less than the quorum may be merged into adjacent regions 202. The adjacent 202 region may be based on geographical location or may be based on a threshold of latency between two regions, e.g., less than 50 milliseconds (ms). Regions 202 without a quorum may be merged with adjacent regions 202 having a quorum or may be merged with other regions 202 not having a quorum. Once regions have been merged, the host evaluation/selection component 110 may determine scores and select a region for hosting as previously described. This can allow for achieving desired quality levels for the media conference.

Thus, in the example of FIG. 4, the quorum is 2. Region 202a has two participation nodes 112a and 112b, thus providing a potential quorum of 2, region 202b has a single participation node 112c, thus providing a potential quorum number of 2, and region 202c has 6 participation nodes 112d-112i, thus providing a potential quorum number of 3. Since region 202b has only a single participation node 112c, regions 202a and 202b may be merged into the merged region 402 since they are adjacent regions.

Figure 5:
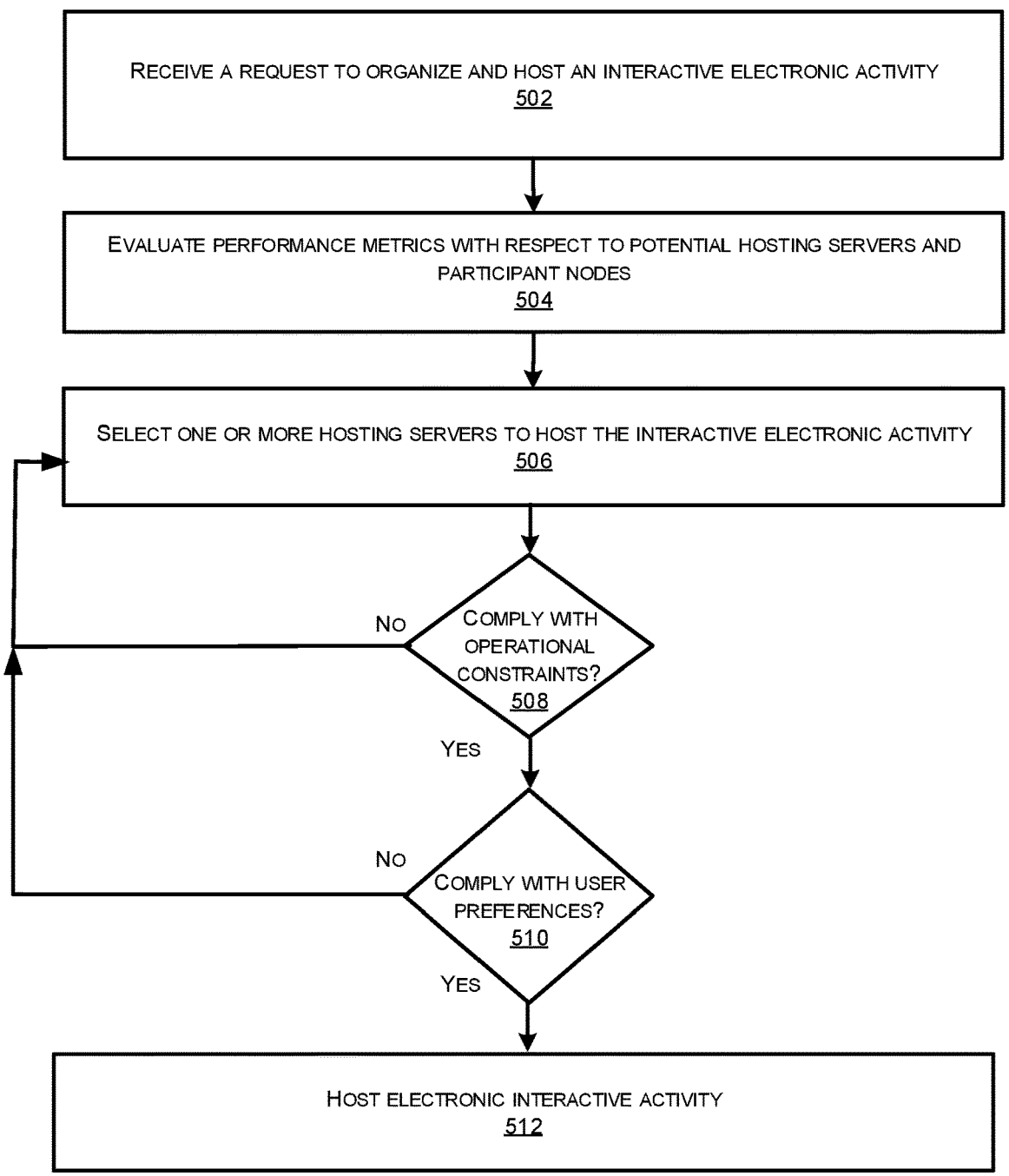
FIG. 5 illustrates a flow diagram of the example method that may be implemented to select hosting servers for an interactive electronic activity.

FIG. 5 illustrates a flow diagram of an example method 500 that illustrates aspects of the functions performed at least partly by the service provider network 102 as described in FIGS. 1-4. The logical operations described herein with respect to FIG. 5 may be implemented (1) as a sequence of computer-implemented acts or program modules running on a computing system, and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in the FIG. 5, and described herein. These operations can also be performed in parallel, or in a different order than those described herein. Some or all of these operations can also be performed by components other than those specifically identified. Although the techniques described in this disclosure are with reference to specific components, in other examples, the techniques may be implemented by less components, more components, different components, or any configuration of components.

FIG. 5 illustrates a flow diagram of the example method 500 that may be implemented to select one or more hosting servers for an interactive electronic activity. For example, the method 500 may be implemented to select one or more hosting servers 106 of a media conferencing service 104 of the service provider network 102.

At block 502, a request to organize and host an interactive electronic activity is received, for example, by the media conferencing service 104. The request may indicate participant nodes, e.g., participant nodes 112, including their geographical location. At block 504, performance metrics may be evaluated. For example, the host evaluation/selection component 110 may gather and evaluate performance metrics 118 with respect to latency, quality of service (QoS), and other metrics related to potential hosting servers 106 with respect to the participant nodes 112. Thus, at block 504 a list of potential hosting servers 106 may be generated. The list may rank hosting servers 106 based on a score that may, in configurations, be weighted.

At block 506, one or more hosting servers may be selected to host the interactive electronic activity. For example, based on the list of ranked hosting servers 106, one or more servers 106 may be selected that operationally may provide the best experience for all, or most, of the participant nodes 112 during the interactive electronic activity. At block 508, it may be determined if the selected one or more hosting servers 106 complies or is in accordance with any operational constraints, e.g., operational constraints 120. If the selected one or more hosting servers 106 are not in accordance with the operational constraints, then the method 500 returns to block 506 to select another one or more hosting servers. Once another one or more hosting servers 106 are selected from the list, e.g., the next highest ranked hosting server(s) 106, the newly selected one or more hosting servers are again compared with the operational constraints at block 508.

Once the selected hosting servers are in accordance with the operational constraints, then the method 500 proceeds to block 510 where the selected one or more hosting servers are checked with respect to user preferences, e.g., user preferences 122. If the selected one or more hosting servers are not in compliance with user preferences, then the method 500 returns to block 506 and a new one or more hosting servers are selected. If the selected one or more hosting servers do comply with the user preferences, then the method 500 proceeds to block 512 and the interactive electronic activity is hosted.

Thus, the techniques and architecture described herein may be used to select the best hosting server(s) in a particular geographical location for the majority of participants in a media conference. In configurations, outliers may be excluded in order to select the best hosting servers for the majority of participants. No media conference participant, including outliers, should have a Tier-4 service. No media conference participant should have a Tier-3 service, unless the media conference participant is an outlier. In configurations, participant nodes may be determined including their geographical regions or locations. Outliers may be excluded if necessary and outliers without proximity to a hosting server region, but with proximity to each other, may be combined into a single region. For each region having one or more hosting servers capable of hosting the media conference, a score may be determined for that region. The scores for the potential regions having hosting servers may be weighted and a list of weighted scores may be generated. One or more hosting servers based on the list may be selected to host the media conference. Operational constraints and/or user preferences may also be used in selecting the one or more hosting servers.

While the configurations and examples provided herein have been made primarily with reference to media conferencing service of a service provider network, it will be appreciated that the techniques and architecture described herein may be used to implement interactive electronic activities using various servers and networks to connect various participant nodes. For example, the techniques and architecture described herein may be used to implement interactive electronic activities using various servers and networks to connect various participant nodes for interactive electronic games.

Figure 6:
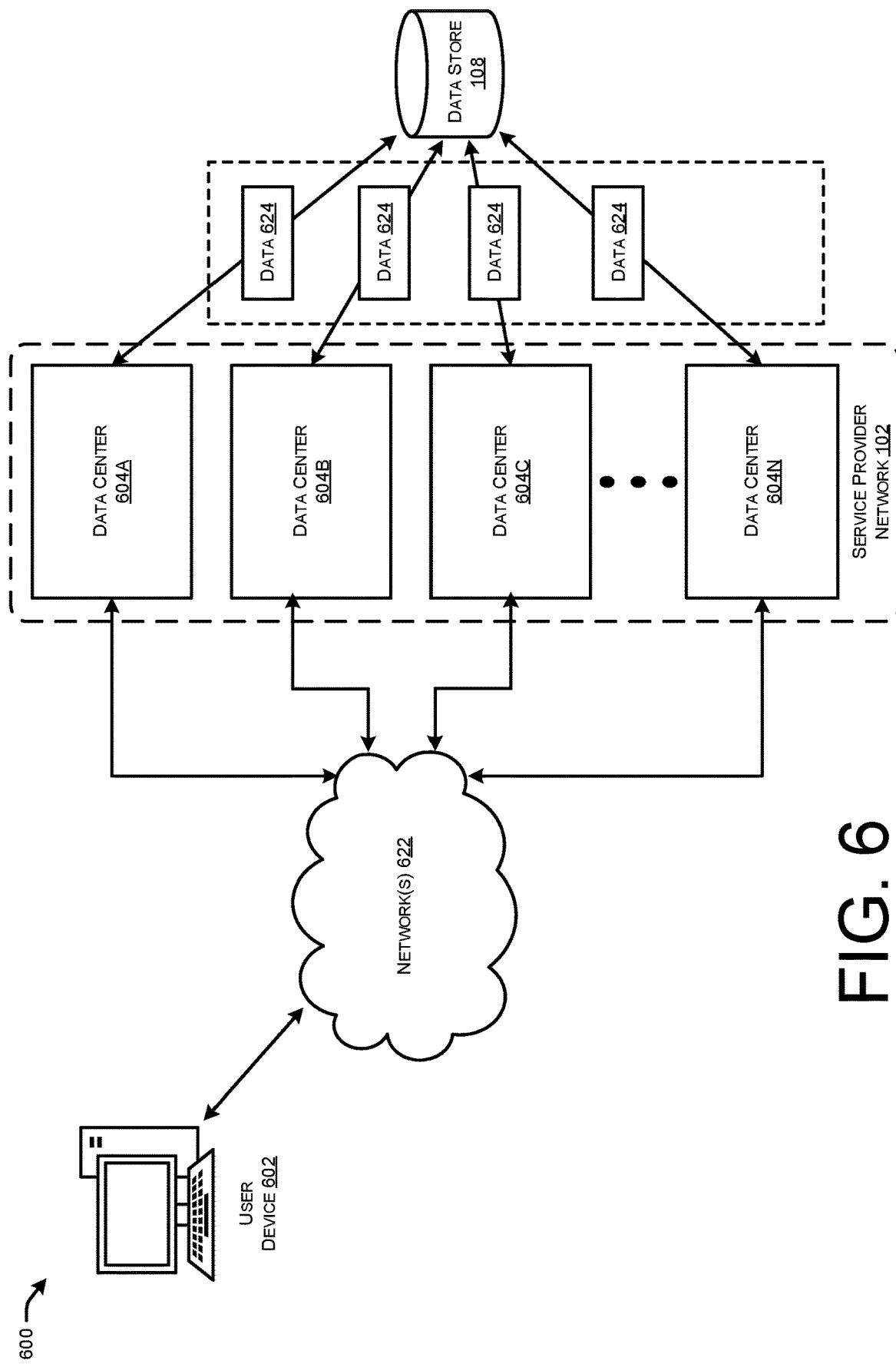
FIG. 6 is a system and network diagram that shows an illustrative operating environment that includes a service provider network that can be configured to implement aspects of the functionality described herein.

FIG. 6 is a system and network diagram that shows one illustrative operating environment 600 for the configurations disclosed herein that includes a service provider network 102 that can be configured to perform the techniques disclosed herein. The service provider network 102 can provide computing resources, like VM instances and storage, on a permanent or an as-needed basis. Among other types of functionality, the computing resources provided by the service provider network 102 may be utilized to implement the various services described above, for example, the media conferencing service 104. As also discussed above, the computing resources provided by the service provider network 102 can include various types of computing resources, such as data processing resources like VM instances provided by a processing service, data storage resources provided by a storage service, networking resources, data communication resources, network services, and the like.

Each type of computing resource provided by the service provider network 102 can be general-purpose or can be available in a number of specific configurations. For example, data processing resources can be available as physical computers or VM instances in a number of different configurations. The VM instances can be configured to execute applications, including web servers, application servers, media servers, database servers, some or all of the network services described above, and/or other types of programs. Data storage resources can include file storage devices, block storage devices, and the like. The service provider network 102 can also be configured to provide other types of computing resources not mentioned specifically herein.

The computing resources provided by the service provider network 102 may be enabled in one embodiment by one or more data centers 604A-604N (which might be referred to herein singularly as "a data center 604" or in the plural as "the data centers 604"). The data centers 604 are facilities utilized to house and operate computer systems and associated components. The data centers 604 typically include redundant and backup power, communications, cooling, and security systems. The data centers 604 can also be located in geographically disparate locations. One illustrative embodiment for a data center 604 that can be utilized to implement the technologies disclosed herein will be described below with regard to FIG. 8.

The data centers 604 may be configured in different arrangements depending on the service provider network 102. For example, one or more data centers 604 may be included in or otherwise make-up an availability zone. Further, one or more availability zones may make-up or be included in a region. Thus, the service provider network 102 may comprise one or more availability zones, one or more regions, and so forth. The regions may be based on geographic areas, such as being located within a predetermined geographic perimeter.

The customers and other users, e.g., the organizer 114 and/or the participant nodes 112, of the service provider network 102 may access the computing resources provided by the service provider network 102 over any wired and/or wireless network(s) 622, which can be a wide area communication network ("WAN"), such as the Internet, an intranet or an Internet service provider ("ISP") network or a combination of such networks. For example, and without limitation, a user device 602 operated by a customer or other user of the cloud-based service provider network 102 may be utilized to access the service provider network 102 by way of the network(s) 622. It should be appreciated that a local-area network ("LAN"), the Internet, or any other networking topology known in the art that connects the data centers 604 to remote customers and other users can be utilized. It should also be appreciated that combinations of such networks can also be utilized.

Each of the data centers 604 may include computing devices that include software, such as applications that receive and transmit data 624. For instance, the computing devices included in the data centers 604 may include software components which transmit, retrieve, receive, or otherwise provide or obtain the data 624 from the data store 108. For example, the data centers 604 may include or store the data store 108, which may include the performance metrics 118, operational constraints 120, and/or user preferences 122.

Figure 7:
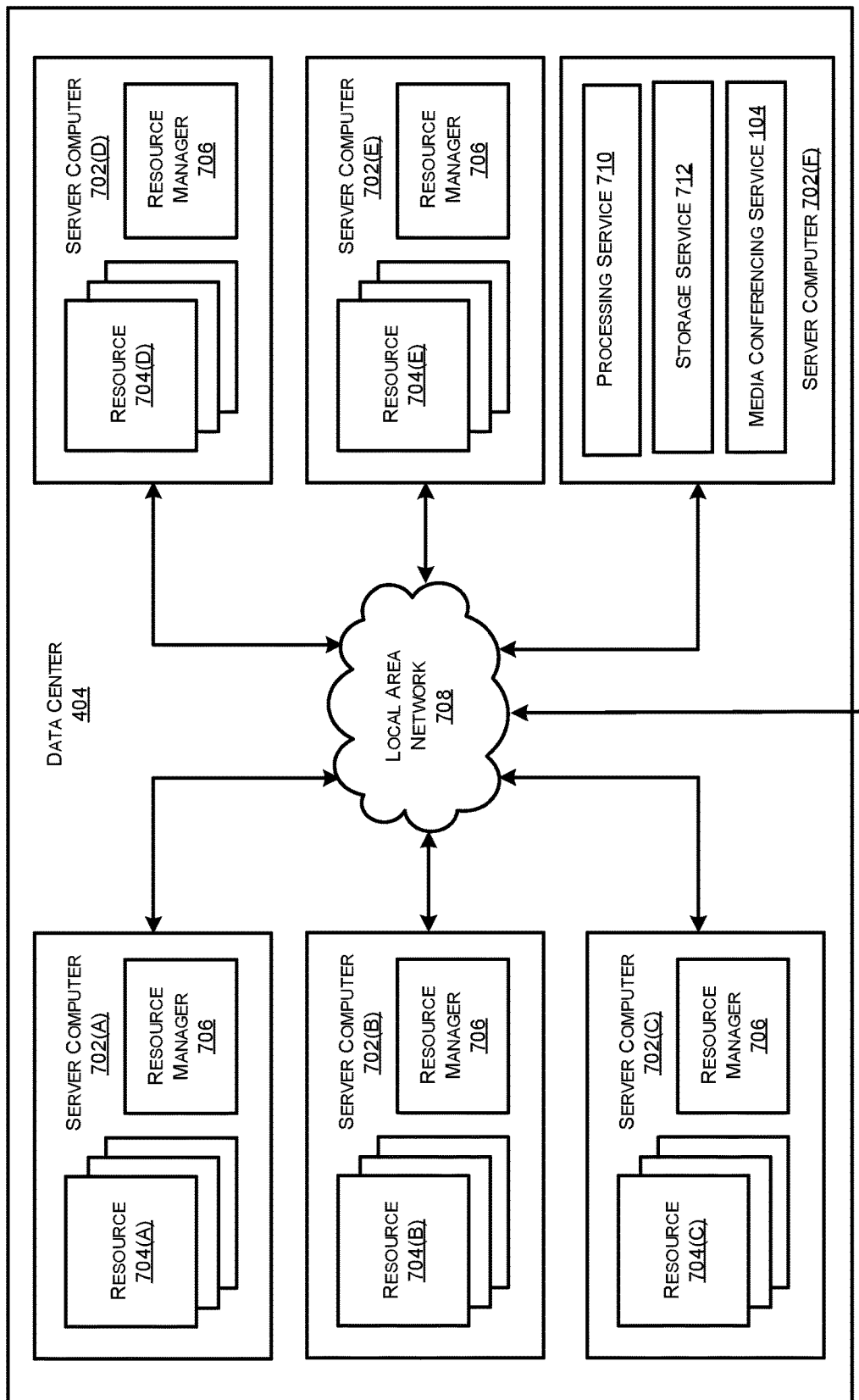
FIG. 7 is a computing system diagram illustrating a configuration for a data center that can be utilized to implement aspects of the technologies disclosed herein.

FIG. 7 is a computing system diagram that illustrates one configuration for a data center 604 that implements aspects of the technologies disclosed herein. The example data center 604 shown in FIG. 7 includes several server computers 702A-702F (which might be referred to herein singularly as "a server computer 702" or in the plural as "the server computers 702") for providing computing resources 704A-704E.

The server computers 702 can be standard tower, rack-mount, or blade server computers configured appropriately for providing the computing resources described herein (illustrated in FIG. 7 as the computing resources 704A-704E). As mentioned above, the computing resources provided by the service provider network 102 can be data processing resources such as VM instances or hardware computing systems, database clusters, computing clusters, storage clusters, data storage resources, database resources, networking resources, and others. Some of the servers 702 can also be configured to execute a resource manager 706 capable of instantiating and/or managing the computing resources. In the case of VM instances, for example, the resource manager 706 can be a hypervisor or another type of program configured to enable the execution of multiple VM instances on a single server computer 702. Server computers 702 in the data center 604 can also be configured to provide network services and other types of services, some of which are described in detail below with regard to FIG. 7.

The data center 604 shown in FIG. 7 also includes a server computer 702F that can execute some or all of the software components described above. For example, and without limitation, the server computer 702F can be configured to execute components of the service provider network 102, including a processing service 710, a storage service 712, the media conferencing service 104 (including hosting servers 106) and/or the other software components described above. The server computer 702F can also be configured to execute other components and/or to store data for providing some or all of the functionality described herein. In this regard, it should be appreciated that the services illustrated in FIG. 7 as executing on the server computer 702F can execute on many other physical or virtual servers in the data centers 604 in various embodiments.

In the example data center 604 shown in FIG. 7, an appropriate LAN 708 is also utilized to interconnect the server computers 702A-702F. It should be appreciated that the configuration and network topology described herein has been greatly simplified and that many more computing systems, software components, networks, and networking devices can be utilized to interconnect the various computing systems disclosed herein and to provide the functionality described above. Appropriate load balancing devices or other types of network infrastructure components can also be utilized for balancing a load between each of the data centers 604A-604N, between each of the server computers 702A-702F in each data center 604, and, potentially, between computing resources in each of the server computers 702. It should be appreciated that the configuration of the data center 604 described with reference to FIG. 7 is merely illustrative and that other implementations can be utilized.

Figure 8:
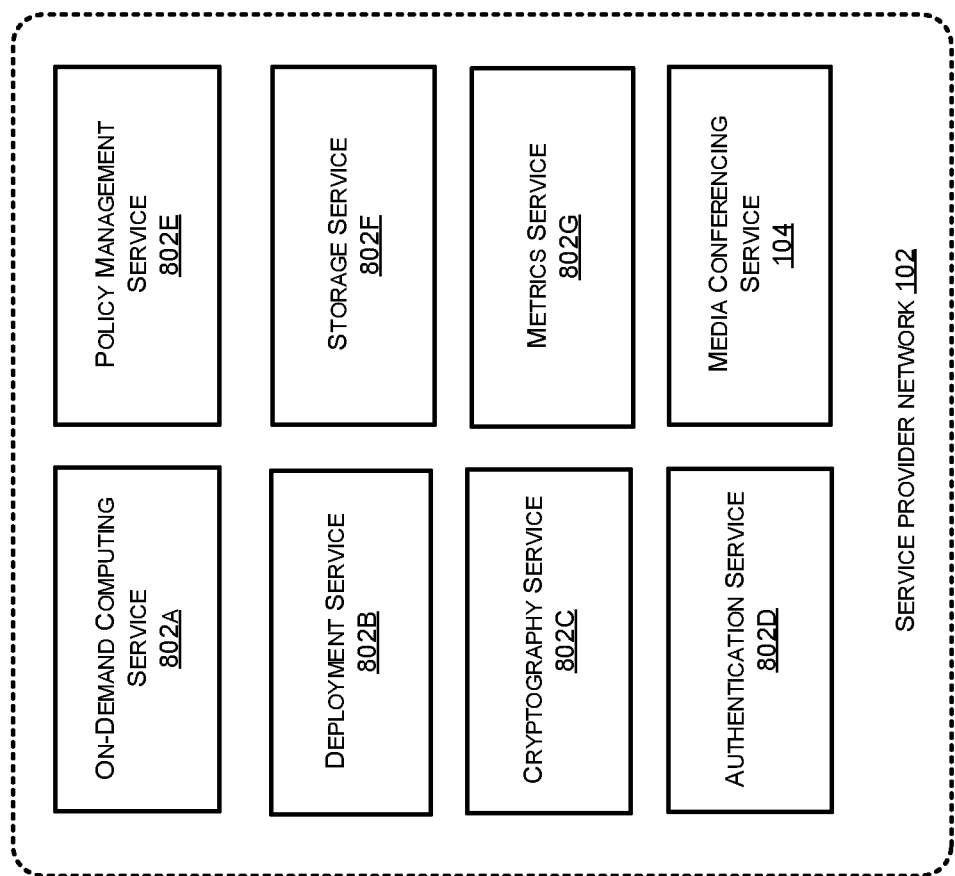
FIG. 8 is a network services diagram that shows aspects of several services that can be provided by and utilized within a system, or a larger system of which the system is a part, which is configured to implement the various technologies disclosed herein.

FIG. 8 is a system and network diagram that shows aspects of several network services that can be provided by and utilized within a service provider network 102 in one embodiment disclosed herein. In particular, and as discussed above, the service provider network 102 can provide a variety of network services to customers and other users of the service provider network 102 including, but not limited to, the media conferencing service 104. The service provider network 102 can also provide other types of services including, but not limited to, an on-demand computing service 802A (e.g., processing service 710), a deployment service 802B, a cryptography service 802C, an authentication service 802D, a policy management service 802E, a storage service 802F (e.g., storage service 712), and/or a metrics service 802G, some of which are described in greater detail below. Additionally, the service-provider network 102 can also provide other services, some of which are also described in greater detail below.

It should be appreciated that customers of the service provider network 102 can include organizations or individuals that utilize some or all of the services provided by the service provider network 102. As described herein, a customer or other user can communicate with the service provider network 102 through a network, such as the network 622 shown in FIG. 6. Communications from a customer computing device, such as the user device 602 shown in FIG. 6, to the service provider network 102 can cause the services provided by the service provider network 102 to operate in accordance with the described configurations or variations thereof.

It is noted that not all embodiments described include the services described with reference to FIG. 8 and that additional services can be provided in addition to or as an alternative to services explicitly described. Each of the services shown in FIG. 8 can also expose network services interfaces that enable a caller to submit appropriately configured API calls to the various services through web service requests. In addition, each of the services can include service interfaces that enable the services to access each other (e.g., to enable a virtual computer system provided by the on-demand computing service 802A to store data in or retrieve data from a storage service). Additional details regarding some of the services shown in FIG. 8 will now be provided.

As discussed above, the on-demand computing service 802A (e.g., the processing service 710) can be a collection of computing resources configured to instantiate VM instances and to provide other types of computing resources on demand. For example, a customer or other user of the service provider network 102 can interact with the on-demand computing service 802A (via appropriately configured and authenticated network services API calls) to provision and operate VM instances that are instantiated on physical computing devices hosted and operated by the service provider network 102.

The VM instances can be used for various purposes, such as to operate as servers supporting a web site, to operate business applications or, generally, to serve as computing resources for the customer. Other applications for the VM instances can be to support database applications such as those described herein, electronic commerce applications, business applications and/or other applications. Although the on-demand computing service 802A is shown in FIG. 8, any other computer system or computer system service can be utilized in the service provider network 102, such as a computer system or computer system service that does not employ virtualization and instead provisions computing resources on dedicated or shared computers/servers and/or other physical devices.

A storage service 802F (e.g., storage service 712) can include software and computing resources that collectively operate to store data using block or file-level storage devices (and/or virtualizations thereof) into data store 108, which may be part of the storage service 802F. The storage devices of the storage service 802F can, for instance, be operationally attached to virtual computer systems provided by the on-demand computing service 802A to serve as logical units (e.g., virtual drives) for the computer systems. A storage device can also enable the persistent storage of data used/generated by a corresponding virtual computer system where the virtual computer system service might only provide ephemeral data storage.

The service provider network 102 can also include a cryptography service 802C. The cryptography service 802C can utilize storage services of the service provider network 102, such as the storage service 802F, to store encryption keys in encrypted form, whereby the keys are usable to decrypt customer keys accessible only to particular devices of the cryptography service 802C. The cryptography service 802C can also provide other types of functionality not specifically mentioned herein.

As illustrated in FIG. 8, the service provider network 102, in various embodiments, also includes an authentication service 802D and a policy management service 802E. The authentication service 802D, in one example, is a computer system (i.e., collection of computing resources) configured to perform operations involved in authentication of users. For instance, one of the services 802 shown in FIG. 8 can provide information from a user to the authentication service 802D to receive information in return that indicates whether or not the requests submitted by the user are authentic.

The policy management service 802E, in one example, is a network service configured to manage policies on behalf of customers or internal users of the service provider network 102. The policy management service 802E can include an interface that enables customers to submit requests related to the management of policy. Such requests can, for instance, be requests to add, delete, change or otherwise modify policy for a customer, service, or system, or for other administrative actions, such as providing an inventory of existing policies and the like.

The service provider network 102 can additionally maintain other services 802 based, at least in part, on the needs of its customers. For instance, the service provider network 102 can maintain a deployment service 802B for deploying program code and/or a data warehouse service in some embodiments. Other services include object-level archival data storage services, database services, and services that manage, monitor, interact with, or support other services. The service provider network 102 can also be configured with other services not specifically mentioned herein in other embodiments. The service provider network 102 can additionally maintain and provide services described herein, such as the metrics service 802G that may gather metrics, e.g., performance metrics 118. Functionality of these components are described above, and throughout.

Figure 9:
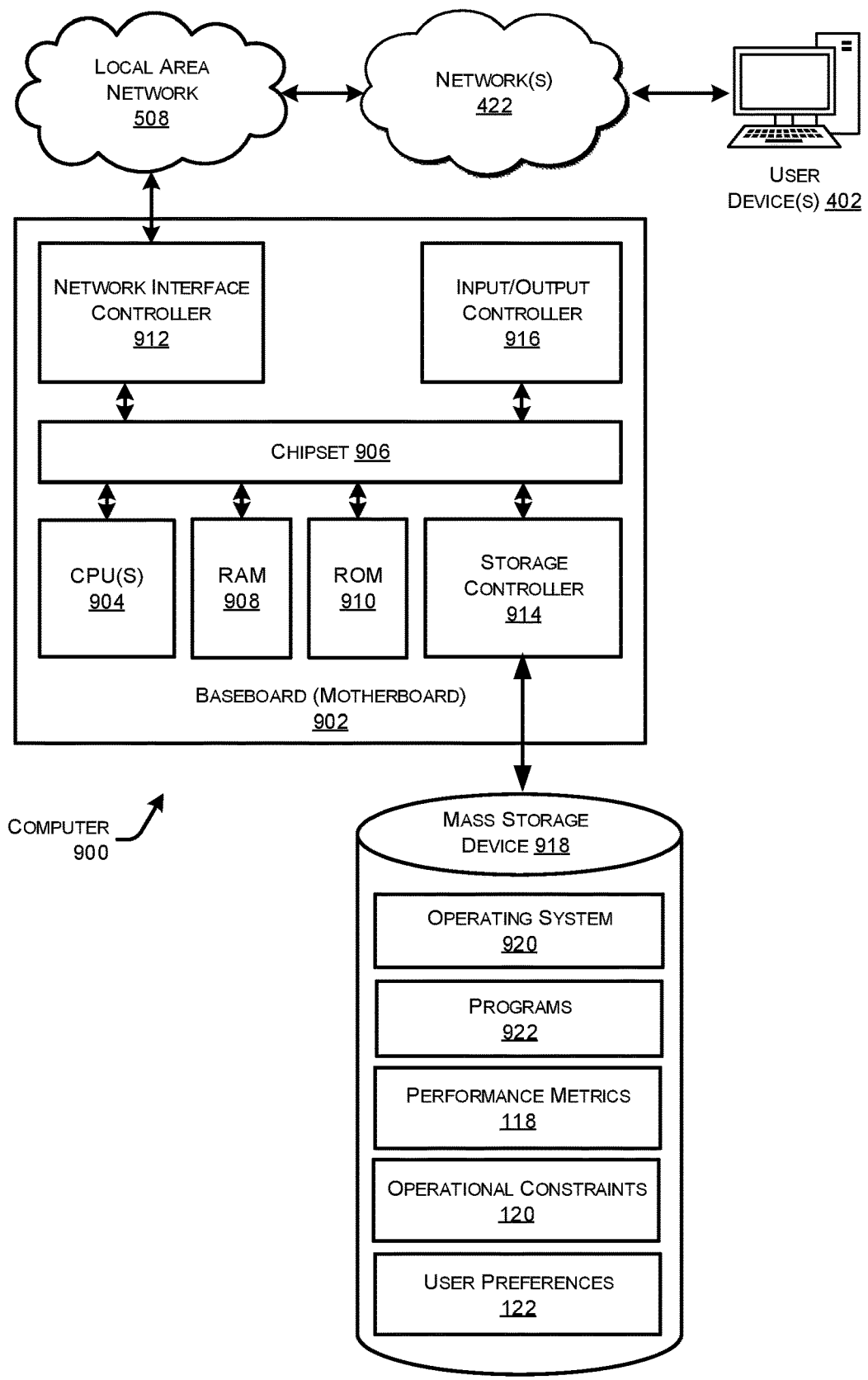
FIG. 9 is a computer architecture diagram showing an illustrative computer hardware architecture for implementing a computing device that can be utilized to implement aspects of the various technologies presented herein.

FIG. 9 shows an example computer architecture for a computer 900 capable of executing program components for implementing the functionality described above. The computer architecture shown in FIG. 9 illustrates a server computer, workstation, desktop computer, laptop, tablet, network appliance, e-reader, smartphone, or other computing device, that can be utilized to execute any of the software components presented herein.

The computer 900 includes a baseboard 902, or "motherboard," which is a printed circuit board to which a multitude of components or devices can be connected by way of a system bus or other electrical communication paths. In one illustrative configuration, one or more central processing units ("CPUs") 904 operate in conjunction with a chipset 906. The CPUs 904 can be standard programmable processors that perform arithmetic and logical operations necessary for the operation of the computer 900.

The CPUs 904 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 906 provides an interface between the CPUs 904 and the remainder of the components and devices on the baseboard 902. The chipset 906 can provide an interface to a RAM 908, used as the main memory in the computer 900. The chipset 906 can further provide an interface to a computer-readable storage medium such as a read-only memory ("ROM") 910 or non-volatile RAM ("NVRAM") for storing basic routines that help to startup the computer 900 and to transfer information between the various components and devices. The ROM 910 or NVRAM can also store other software components necessary for the operation of the computer 900 in accordance with the configurations described herein.

The computer 900 can operate in a networked environment using logical connections to remote computing devices and computer systems through a network, such as the network 708. The chipset 906 can include functionality for providing network connectivity through a Network Interface Controller (NIC) 912, such as a gigabit Ethernet adapter. The NIC 912 is capable of connecting the computer 900 to other computing devices, e.g., user device(s) 602, over the network 708 (or 622). It should be appreciated that multiple NICs 912 can be present in the computer 900, connecting the computer to other types of networks and remote computer systems.

The computer 900 can be connected to a mass storage device 918 that provides non-volatile storage for the computer. The mass storage device 918 can store an operating system 920, programs 922 (e.g., agents, etc.), data, applications(s), performance metrics 118, operational constraints 120, and/or user preferences 122, which have been described in greater detail herein. The mass storage device 918 can be connected to the computer 900 through a storage controller 914 connected to the chipset 906. The mass storage device 918 can consist of one or more physical storage units. The storage controller 914 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 900 can store data on the mass storage device 918 by transforming the physical state of the physical storage units to reflect the information being stored. The specific transformation of physical states can depend on various factors, in different embodiments of this description. Examples of such factors can include, but are not limited to, the technology used to implement the physical storage units, whether the mass storage device 918 is characterized as primary or secondary storage, and the like.

For example, the computer 900 can store information to the mass storage device 918 by issuing instructions through the storage controller 914 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 900 can further read information from the mass storage device 918 by detecting the physical states or characteristics of one or more particular locations within the physical storage units.

In addition to the mass storage device 918 described above, the computer 900 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 900. In some examples, the operations performed by the service provider network 102, and/or any components included therein, may be supported by one or more devices similar to computer 900. Stated otherwise, some or all of the operations performed by the service provider network 102, and/or any components included therein, may be performed by one or more computer devices 900 operating in a cloud-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the mass storage device 918 can store an operating system 920 utilized to control the operation of the computer 900. According to one embodiment, the operating system comprises the LINUX operating system. According to another embodiment, the operating system comprises the WINDOWS® SERVER operating system from MICROSOFT Corporation of Redmond, Wash. According to further embodiments, the operating system can comprise the UNIX operating system or one of its variants. It should be appreciated that other operating systems can also be utilized. The mass storage device 918 can store other system or application programs and data utilized by the computer 900.

In one embodiment, the mass storage device 918 or other computer-readable storage media is encoded with computer-executable instructions which, when loaded into the computer 900, transform the computer from a general-purpose computing system into a special-purpose computer capable of implementing the embodiments described herein. These computer-executable instructions transform the computer 900 by specifying how the CPUs 904 transition between states, as described above. According to one embodiment, the computer 900 has access to computer-readable storage media storing computer-executable instructions which, when executed by the computer 900, perform the various processes described above with regard to FIGS. 1-5. The computer 900 can also include computer-readable storage media having instructions stored thereupon for performing any of the other computer-implemented operations described herein.

The computer 900 can also include one or more input/output controllers 916 for receiving and processing input from a number of input devices, such as a keyboard, a mouse, a touchpad, a touch screen, an electronic stylus, or other type of input device. Similarly, an input/output controller 916 can provide output to a display, such as a computer monitor, a flat-panel display, a digital projector, a printer, or other type of output device. It will be appreciated that the computer 900 might not include all of the components shown in FIG. 9, can include other components that are not explicitly shown in FIG. 9, or might utilize an architecture completely different than that shown in FIG. 9.

The computer 900 may transmit, receive, retrieve, or otherwise provide and/or obtain data and/or results to and/or from the service provider network 102. The computer 900 may store the data on the operating system 920, and/or the programs 922 that are stored in the mass storage device 918 to update or otherwise modify the operating system 920 and/or the programs 922.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative of some embodiments that fall within the scope of the claims of the application.

What is claimed is:
1. A method comprising:
receiving, at a media conferencing service of a service provider network, a request for a media conference involving a plurality of participant nodes that include a first participant node and a second participant node;
determining a first geographical location that includes the first participant node;
determining a second geographical location that includes the second participant node, the second geographical location being different than the first geographical location;
evaluating, by the media conferencing service, performance metrics related to a plurality of potential hosting servers of the service provider network with respect to the first participant node and with respect to the second participant node, at least two of the plurality of potential hosting servers being located in different geographical locations, the performance metrics comprising one or more of:
audio quality between (i) each of the plurality of potential hosting servers, and (ii) the first participant node and the second participant node; and
video quality between (i) each of the plurality of potential hosting servers, and (ii) the first participant node and the second participant node; at or prior to a first time:
based on evaluating the performance metrics, disregarding from consideration a potential hosting server of the plurality of potential hosting servers, wherein disregarding from consideration the potential hosting server comprises:
determining that at least one participant node of the plurality of participant nodes is within a third geographical location in which the potential hosting server resides, the third geographic location being different than the first geographic location and the second geographic location;
determining that a first quality of service, during the media conference, for a quorum of the plurality of participant nodes would meet or exceed a predetermined threshold as a result of disregarding from consideration the potential hosting server; and
determining that a second quality of service, during the media conference, for the at least one participant node would be less than the predetermined threshold as a result of disregarding from consideration the potential hosting server;
based on evaluating the performance metrics, without considering the potential hosting server to host the media conference, and at a second time subsequent to the first time, determining, by the media conferencing service, a desired hosting server of the plurality of potential hosting servers to host the media conference;
confirming, at or after the second time, that the desired hosting server is functional and is accessible to each of the plurality of participant nodes;
hosting, by the media conferencing service using the desired hosting server and based on confirming that the desired hosting server is functional and accessible, the media conference;
determining, after a beginning of the media conference and prior to a completion of the media conference, that a third participant node has joined the media conference or that one of the plurality of participant nodes has left the media conference; and determining, based on the third participant node joining the media conference or the one of the plurality of participant nodes leaving the media conference, that the media conference is to be switched from the desired hosting server to an alternative hosting server at a fourth geographical location that is different than a fifth geographical location of the desired hosting server.

2. The method of claim 1, further comprising:
evaluating, by the media conferencing service, operational constraints comprising one or more of availability of the desired hosting server, capacity of the desired hosting server, time of day, legal issues, regulations, and functionality of the desired hosting server; and
evaluating, by the media conferencing service, user preferences comprising desired locations of hosting servers, regulations, legal issues, pricing, and corporate policies.

3. The method of claim 1, wherein the audio quality and the video quality are based on round-trip time (RTT) between potential hosting servers and the plurality of participant nodes.

4. The method of claim 2, wherein:
evaluating the performance metrics related to the plurality of potential hosting servers comprises based on at least one of (i) the audio quality, or (ii) the video quality, selecting the potential hosting server for consideration; and
evaluating the operational constraints and evaluating the user preferences comprises based on the potential hosting server failing to satisfy a threshold level of quality for the media conference and based on at least one of (i) the operational constraints, or (ii) the user preferences, eliminating the potential hosting server from consideration for hosting the media conference.

5. A method comprising:
receiving a request for an electronic interactive activity involving a plurality of nodes;
evaluating at least one factor related to a plurality of potential servers with respect to the plurality of nodes, at least two of the plurality of potential servers being located in different geographical locations;
based at least in part on the at least one factor, disregarding from consideration a potential server of the plurality of potential servers, wherein disregarding from consideration the potential server comprises:
determining that at least one node of the plurality of nodes is within a geographic location that includes the potential server and that is different than the different geographic locations;
determining that a first quality of service, during the electronic interactive activity, for a quorum of the plurality of nodes would meet or exceed a predetermined threshold as a result of disregarding from consideration the potential server; and
determining that a second quality of service, during the electronic interactive activity, for the at least one node would be less than the predetermined threshold as a result of disregarding from consideration the potential server; and
based at least in part on evaluating the at least one factor and without considering the potential server to host the electronic interactive activity, selecting one or more of the plurality of potential servers to host the electronic interactive activity.

6. The method of claim 5, wherein the at least one factor comprises latency between the plurality of nodes and the plurality of potential servers.

7. The method of claim 5, wherein the at least one factor comprises one or more of:
audio quality between (i) each of the plurality of potential servers, and (ii) the plurality of nodes;
video quality between (i) each of the plurality of potential servers, and (ii) the at least two of the plurality of nodes, wherein the audio quality and the video quality are based at least in part on round-trip time (RTT) between the plurality of potential servers and the plurality of nodes;
operational constraints comprising one or more of availability of the one or more of the plurality of potential servers, capacity of the one or more of the plurality of potential servers, time of day, legal issues, regulations, and functionality of the one or more of the plurality of potential servers; and
user preferences comprising desired locations of servers, regulations, legal issues, pricing, and corporate policies.

8. The method of claim 7, wherein evaluating the at least one factor related to the plurality of potential servers comprises:
based on at least one of (i) the audio quality, or (ii) the video quality, selecting the potential server for consideration; and
based on at least one of (i) the operational constraints, or (ii) the user preferences, eliminating the potential server from consideration.

9. The method of claim 5, wherein:
evaluating the at least one factor related to the plurality of potential servers with respect to the plurality of nodes comprises generating a weighted list of potential servers based at least in part on evaluating the at least one factor related to the plurality of potential servers with respect to the plurality of nodes; and
selecting the one or more of the plurality of potential servers to host the electronic interactive activity comprises selecting the one or more of the plurality of potential servers based at least in part on the weighted list of potential servers.

10. The method of claim 9, wherein the at least one factor is a first factor and the method further comprises:
evaluating at least a second factor related to the plurality of potential servers with respect to the plurality of nodes,
wherein selecting the one or more of the plurality of potential servers based at least in part on the weighted list of potential servers further comprises selecting the one or more of the plurality of potential servers based at least in part on evaluating at least the second factor.

11. The method of claim 5, further comprising:
determining the quorum of the plurality of nodes for regions that include the plurality of nodes, the regions defined at least in part based on geographical locations of nodes; and
merging regions that include less than the quorum of the plurality of nodes.

12. One or more computer-readable media storing computer-executable instructions that, when executed, cause one or more processors to perform operations comprising:
receiving a request for an electronic interactive activity involving a plurality of nodes;
evaluating at least one factor related to a plurality of potential servers with respect to the plurality of nodes, at least two of the plurality of potential servers being located in different geographical locations;

based at least in part on the at least one factor, disregarding from consideration a potential server of the plurality of potential servers, wherein disregarding from consideration the potential server comprises:
  determining that at least one node of the plurality of nodes is within a geographic location that includes the potential server and that is different than the different geographic locations;
  determining that a first quality of service, during the electronic interactive activity, for a quorum of the plurality of nodes would meet or exceed a predetermined threshold as a result of disregarding from consideration the potential server; and
  determining that a second quality of service, during the electronic interactive activity, for the at least one node would be less than the predetermined threshold as a result of disregarding from consideration the potential server;
confirming that one or more of the plurality of potential servers are functional and are accessible to each of the plurality of nodes; and
based at least in part on evaluating the at least one factor and confirming that the one or more of the plurality of potential servers are functional and accessible, selecting the one or more of the plurality of potential servers to host the electronic interactive activity.

13. The one or more computer-readable media of claim 12, wherein the at least one factor comprises one or more of:
  audio quality between (i) each of the plurality of potential servers, and (ii) the plurality of nodes;
  video quality between (i) each of the plurality of potential servers, and (ii) the at least two of the plurality of nodes;
  operational constraints comprising one or more of availability of the one or more of the plurality of potential servers, capacity of the one or more of the plurality of potential servers, time of day, legal issues, regulations, and functionality of the one or more of the plurality of potential servers; and
  user preferences comprising desired locations of servers, regulations, legal issues, pricing, and corporate policies.

14. The one or more computer-readable media of claim 13, wherein
  the audio quality and video quality are based at least in part on round-trip time (RTT) between the plurality of potential servers and the plurality of nodes.

15. The one or more computer-readable media of claim 13, wherein evaluating the at least one factor related to the plurality of potential servers comprises:
  based at least in part on at least one of (i) the audio quality, or (ii) the video quality, selecting the potential server for consideration; and
  based on at least one of either (i) the operational constraints, or (ii) the user preferences, eliminating the potential server from consideration.

16. The one or more computer-readable media of claim 14, wherein:
  evaluating the at least one factor related to the plurality of potential servers with respect to the plurality of nodes comprises generating a weighted list of potential servers based at least in part on evaluating the at least one factor related to the plurality of potential servers with respect to the plurality of nodes; and
  selecting the one or more of the plurality of potential servers to host the electronic interactive activity comprises selecting the one or more of the plurality of potential servers based at least in part on the weighted list of potential servers.

17. The one or more computer-readable media of claim 16, wherein the at least one factor is a first factor and the operations further comprise:
  evaluating at least a second factor related to the plurality of potential servers with respect to the plurality of nodes,
  wherein selecting the one or more of the plurality of potential servers based at least in part on the weighted list of potential servers further comprises selecting the one or more of the plurality of potential servers based at least in part on evaluating at least the second factor.

18. The one or more computer-readable media of claim 12, wherein the operations further comprise:
  determining the quorum of the plurality of nodes for regions that include the plurality of nodes, the regions defined at least in part based on different geographical locations of the plurality of nodes; and
  merging regions that include less than the quorum of the plurality of nodes.

19. The method of claim 1, wherein determining the desired hosting server to host the media conference includes selecting the desired hosting server and a second desired hosting server of the plurality of hosting servers that is different than the desired hosting server to host the media conference, the desired hosting server and the second desired hosting server being within a same geographical area.

20. The method of claim 1, further comprising:
  determining, at a first time, historical performance metrics associated with the plurality of hosting servers;
  selecting, based on the historical performance metrics, an initial desired hosting server of the plurality of hosting servers to host the media conference;
  determining the performance metrics at a second time that is subsequent to the first time; and
  determining the desired hosting server to host the media conference in place of the initial desired hosting server based on a comparison between the historical performance metrics and the performance metrics.

* * * * *